(12) United States Patent
Kim et al.

(10) Patent No.: US 9,139,183 B2
(45) Date of Patent: Sep. 22, 2015

(54) INTEGRATED ELECTRONIC HYDRAULIC BRAKE SYSTEM

(71) Applicant: MANDO CORPORATION, Pyeongtaek-si (KR)

(72) Inventors: Yong Kap Kim, Suwon-si (KR); I Jin Yang, Seongnam-si (KR); Seong Ho Choi, Anyang-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 132 days.

(21) Appl. No.: 13/796,386

(22) Filed: Mar. 12, 2013

(65) Prior Publication Data

US 2013/0241276 A1 Sep. 19, 2013

(30) Foreign Application Priority Data

Mar. 13, 2012 (KR) ........................ 10-2012-0025452

(51) Int. Cl.
*B60T 8/40* (2006.01)
*B60T 13/14* (2006.01)
*B60T 8/36* (2006.01)

(52) U.S. Cl.
CPC ............... *B60T 13/142* (2013.01); *B60T 8/368* (2013.01); *B60T 8/4081* (2013.01)

(58) Field of Classification Search
CPC ... B60T 8/4081; B60T 8/4872; B60T 13/686; B60T 7/042; B60L 7/26
USPC .................. 303/87, 113.5, 114.2, 116.2, 155, 303/113.4, 187, 116.4, 119.3, DIG. 10
See application file for complete search history.

(56) References Cited

U.S. PATENT DOCUMENTS

| | | | | |
|---|---|---|---|---|
| 5,407,257 | A | * | 4/1995 | Iwata ........................ 303/122.09 |
| 5,567,022 | A | * | 10/1996 | Linkner, Jr. ..................... 303/87 |
| 5,568,962 | A | * | 10/1996 | Enomoto et al. .................. 303/3 |
| 6,139,119 | A | * | 10/2000 | Otomo ........................ 303/113.1 |
| 6,186,602 | B1 | | 2/2001 | Jonner et al. |
| 6,286,914 | B1 | * | 9/2001 | Sawada et al. ............. 303/113.2 |
| 6,412,882 | B1 | * | 7/2002 | Isono et al. ................ 303/114.1 |

(Continued)

FOREIGN PATENT DOCUMENTS

CN 101987616 A 3/2011
JP 2000-506817 6/2000

(Continued)

OTHER PUBLICATIONS

Office action dated Aug. 6, 2013 from corresponding Korean Patent Application No. 10-2012-0025452 and its English translation by Google Translate.

(Continued)

*Primary Examiner* — Bradley King
*Assistant Examiner* — Stephen Bowes
(74) *Attorney, Agent, or Firm* — Ladas & Parry, LLP (57) ABSTRACT

Disclosed is an integrated electronic hydraulic brake system including an actuator having a master cylinder and a pedal simulator, an electronic stability control (ESC), and a hydraulic power unit (HPU) which are configured as a single unit. The integrated electronic hydraulic brake system may include an integrated hydraulic control unit and a power source unit, wherein the power source unit is separately provided to isolate the operational noise, and the integrated hydraulic control unit and the power source unit are connected to each other via an external pipe.

11 Claims, 4 Drawing Sheets

(56) References Cited

U.S. PATENT DOCUMENTS

| | | | |
|---|---|---|---|
| 6,450,591 B1 * | 9/2002 | Kawahata et al. | 303/122.05 |
| 6,585,332 B2 * | 7/2003 | Kusano et al. | 303/113.4 |
| 6,705,683 B2 | 3/2004 | Niepelt | |
| 6,899,403 B2 * | 5/2005 | Isono et al. | 303/11 |
| 7,630,815 B2 * | 12/2009 | Tanaka et al. | 701/70 |
| 2001/0006306 A1 * | 7/2001 | Kagawa et al. | 303/20 |
| 2004/0183367 A1 * | 9/2004 | Kusano | 303/11 |
| 2005/0110338 A1 * | 5/2005 | Tsunehara | 303/10 |
| 2006/0066146 A1 * | 3/2006 | Otomo | 303/151 |
| 2009/0315391 A1 * | 12/2009 | Tanaka et al. | 303/113.5 |
| 2013/0320750 A1 * | 12/2013 | Kim | 303/6.01 |

FOREIGN PATENT DOCUMENTS

| | | |
|---|---|---|
| JP | 2002-510580 | 4/2002 |
| JP | 2007-040460 | 2/2007 |
| JP | 2007-247683 | 9/2007 |
| JP | 2010-503813 | 2/2010 |
| KR | 10-2002-0084244 | 11/2002 |
| KR | 10-0682522 | 2/2007 |
| KR | 10-2011-0011938 | 2/2011 |

OTHER PUBLICATIONS

Office action dated Jul. 22, 2013 from corresponding Korean Patent Application No. 10-2012-0049985 and its English translation by Google Translate.

Office Action dated Oct. 8, 2014 for Chinese Patent Application No. 201310078643.3.

* cited by examiner

INTEGRATED ELECTRONIC HYDRAULIC BRAKE SYSTEM

CROSS-REFERENCE TO RELATED APPLICATION

This application claims the benefit of Korean Patent Application No. 2012-0025452, filed on Mar. 13, 2012 in the Korean Intellectual Property Office, the disclosure of which is incorporated herein by reference in its entirety.

BACKGROUND

1. Field

Embodiments of the present invention relate to an integrated electronic hydraulic brake system including an actuator having a master cylinder and a pedal simulator, an electronic stability control (ESC), and a hydraulic power unit (HPU) which are configured as a single unit.

2. Description of the Related Art

Recently, development of hybrid vehicles, fuel cell vehicles and electric vehicles has been vigorously carried out in order to improve fuel efficiency and reduce exhaust gas. A brake device, i.e., a brake device of a brake system for vehicles, which functions to decelerate or stop a vehicle, is essentially installed in such vehicles.

In general, brake devices of brake systems for vehicles include a vacuum brake to generate braking force using suction pressure of an engine, and a hydraulic brake to generate braking force using hydraulic pressure.

The vacuum brake produces large braking force with a small force through a vacuum booster using a difference between suction pressure of a vehicle engine and atmospheric pressure. That is, the vacuum brake generates output greater than force applied to a brake pedal when a driver pushes the brake pedal.

In case of such a conventional vacuum brake, suction pressure of the vehicle engine is supplied to the vacuum booster to form a vacuum, and therefore, fuel efficiency is lowered. Further, the engine is driven at all times to form the vacuum even when the vehicle is stopped.

Furthermore, a fuel cell vehicle and an electric vehicle have no engine and thus application of the conventional vacuum brake boosting the driver's pedal force during braking to the fuel cell vehicle and the electric vehicle may not be allowed, and a hybrid vehicle implements an idle stoppage function during stopping to improve fuel efficiency and requires introduction of a hydraulic brake.

That is, since implementation of a regenerative braking function is required to improve fuel efficiency in all vehicles, the regenerative braking function is easily implemented by employing a hydraulic brake.

In case of an electronic hydraulic brake system which is a kind of hydraulic brake, when a driver pushes a pedal, an electronic control unit senses pushing of the pedal and supplies hydraulic pressure to a master cylinder, thereby transmitting hydraulic pressure for braking to a wheel cylinder (not shown) of each wheel to generate braking force.

Figure 1:
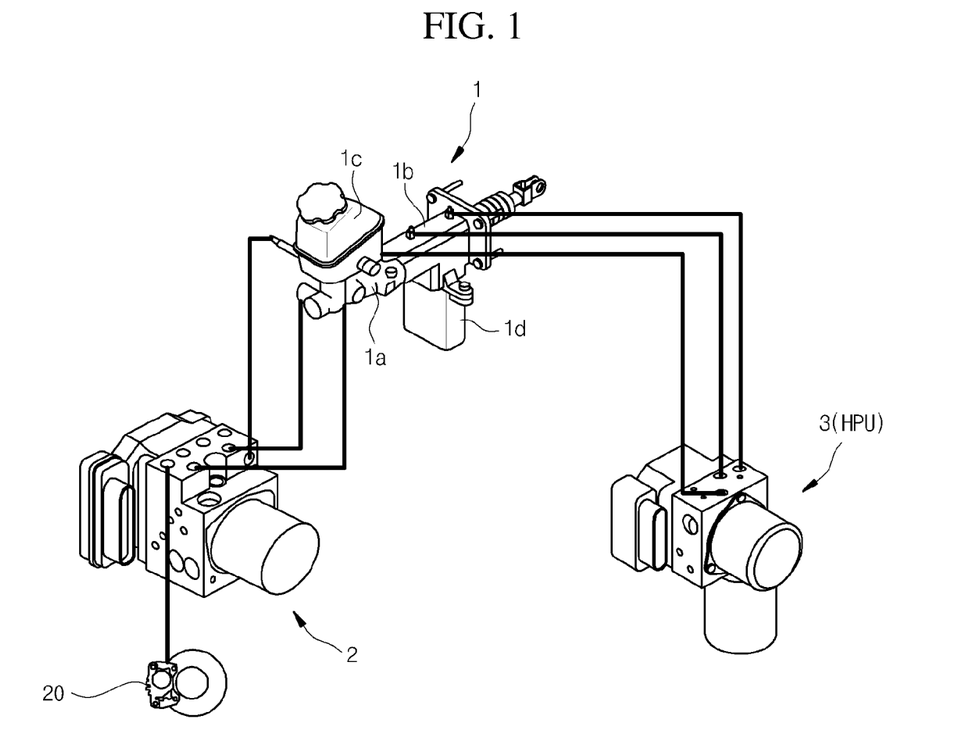
FIG. 1 is a view schematically illustrating a configuration of a conventional electronic hydraulic brake system.

In order to control hydraulic pressure transmitted to wheel cylinders 20, the electronic hydraulic brake system includes, as shown in FIG. 1, an actuator 1 including a master cylinder 1a, booster 1b, reservoir 1c and pedal simulator 1d, an electronic stability control (ESC) 2 to independently control braking force to each wheel, and an hydraulic power unit (HPU) 3 including a motor, pump, accumulator and control valve, which are respectively configured as a unit.

The above units 1, 2 and 3 constituting the electronic hydraulic brake system are separately provided and installed. As a result, it may be necessary to secure a space to install the electronic hydraulic brake system. In addition, the weight of the electronic hydraulic brake system is increased. For these reasons, an advanced electronic hydraulic brake system which secures safety of a vehicle during braking, improves fuel efficiency, and provides proper pedal feel has been required.

Therefore, according to the above requirements, research and development on an electronic hydraulic brake system which has a simple configuration, exhibits normal braking force even when a failure occurs and is easily controlled are underway.

SUMMARY

Therefore, it is an aspect of the present invention to provide an integrated electronic hydraulic brake system which has a simple configuration to improve braking safety and installation efficiency in a vehicle, thereby providing stable pedal feel during braking, and which supports regenerative braking, thereby improving fuel efficiency.

Additional aspects of the invention will be set forth in part in the description which follows and, in part, will be obvious from the description, or may be learned from practice of the invention.

In accordance with an aspect of the present invention, an integrated electronic hydraulic brake system for a vehicle includes an integrated hydraulic control device including a master cylinder to generate hydraulic pressure based on pedal force of a brake pedal, a reservoir coupled to an upper portion of the master cylinder to store oil, two hydraulic circuits, each of the hydraulic circuits being connected to two wheels of the vehicle, an accumulator to store a predetermined level of pressure, flow control valves and pressure reducing valves connected to the two hydraulic circuits to control pressure transmitted from the accumulator to wheel cylinders installed at the wheels, a balance valve to connect the two hydraulic circuits and control pressure difference between the two hydraulic circuits, a pedal simulator connected to the master cylinder to provide reaction force of the brake pedal, and a simulation valve to control connection between the master cylinder and the pedal simulator, and a power source unit including a pump to suction oil from the reservoir and discharge the suctioned oil to the accumulator to generate pressure in the accumulator and a motor to drive the pump, wherein the power source unit is configured as a separate unit to isolate noise generated from the power source unit, and the integrated hydraulic control device and the power source unit are connected to each other via an external pipe.

The two hydraulic circuits may include a first hydraulic circuit connected to a right front wheel and a left rear wheel, and a second hydraulic circuit connected to a left front wheel and a right rear wheel.

The balance valve may be a Normally Closed type solenoid valve, the balance valve being closed in normal times and opened based on pressure information when the pressure difference occurs between the two hydraulic circuits.

The accumulator and the pump may be connected to each other via the external pipe, and the external pipe may have a check valve installed therein to prevent backward flow of pressure of the accumulator.

Each of the hydraulic circuits may include a Normally Open type solenoid valve disposed upstream of the wheel cylinders to control transmission of the hydraulic pressure to the wheel cylinders, a Normally Closed type solenoid valve disposed downstream of the wheel cylinders to control discharge of the hydraulic pressure from the wheel cylinders, and a return channel to connect the Normally Closed solenoid valve to the reservoir.

The integrated hydraulic control device may further include first and second backup channels to connect the master cylinder to the two hydraulic circuits to control braking oil when the integrated electronic hydraulic brake system is abnormally operated, a first shut off valve to control connection between the first backup channel and the master cylinder, and a second shut off valve to control connection between the second backup channel and the master cylinder.

The first and second shut off valves may be Normally Open type valves adapted to remain open in normal times and be closed during normal operation of braking.

A simulation check valve may be further provided in a channel connecting the master cylinder to the pedal simulator such that the pressure according to the pedal force of the brake pedal is transmitted to the pedal simulator only through the simulation valve.

The simulation check valve may be a pipe check valve having no spring to return the remaining pressure of the pedal simulator when the pedal force of the brake pedal is released.

A plurality of pulsation attenuators may be provided in channels connecting the flow control valves and pressure reducing valves with the two hydraulic circuits to minimize pressure pulsation.

The flow control valves and the pressure reducing valves may be Normally Closed type valves adapted to remain closed in normal times.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout. The terms used in the following description are defined taking into consideration the functions obtained in accordance with the embodiments, and the definitions of these terms should be determined based on the overall content of this specification. Therefore, the configurations disclosed in the embodiments and the drawings of the present invention are only exemplary and do not encompass the full technical spirit of the invention, and thus it will be appreciated that the embodiments may be variously modified and changed.

Figure 2:
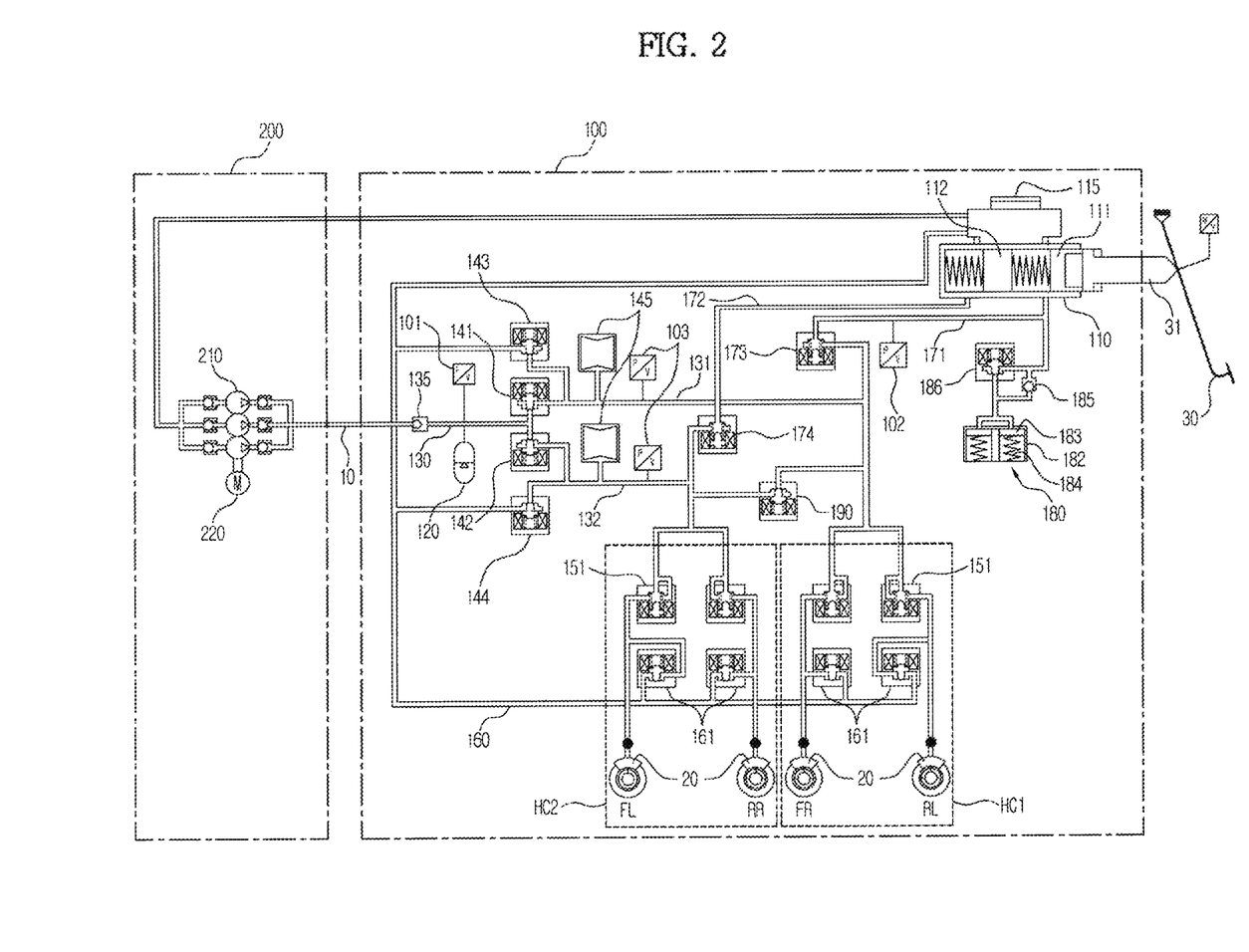
FIG. 2 is a hydraulic circuit diagram showing a state in which an integrated electronic hydraulic brake system according to an embodiment of the present invention is not operated.

FIG. 2 is a hydraulic circuit diagram showing a state in which an integrated electronic hydraulic brake system according to an embodiment of the present invention is not operated.

The integrated electronic hydraulic brake system may include two units. Referring to FIG. 2, the integrated electronic hydraulic brake system may include an integrated hydraulic control device 100 including a brake pedal 30 manipulated by a driver during braking, a master cylinder 110, force from the brake pedal 30 being transmitted thereto, a reservoir 115 coupled to the upper portion of the master cylinder 110 to store oil, two hydraulic circuits HC1 and HC2 connected respectively to two wheels RR, RL, FR and FL, an accumulator 120 to store a predetermined level of pressure, a pedal simulator 180 connected to the master cylinder 110 to provide reaction force of the brake pedal 30, a simulation valve 186 installed in an channel 188 connecting the pedal simulator 180 to the reservoir 115, and a balance valve 190 to connect the two hydraulic circuits HC1 and HC2 to control pressure difference between the hydraulic circuits HC1 and HC2, and a power source unit 200 including a pump 210 to suction oil from the reservoir 115 and discharge the suctioned oil to the accumulator 120 to generate pressure in the accumulator 120 and a motor 220 to drive the pump 210.

Also, the integrated hydraulic control device 100 may further include flow control valves 141 and 142 connected respectively to the two hydraulic circuits HC1 and HC2, pressure reducing valves 143 and 144, and pressure sensors 101, 102 and 103, so as to control pressure transmitted from the accumulator 120 to wheel cylinders 20 installed at wheels FL, FR, RL, and RR of a vehicle.

The integrated hydraulic control device 100 and the power source unit 200 are connected to each other via an external pipe 10. That is, the pump 210 of the power source unit 200 and the accumulator 120 of the integrated hydraulic control device 100 are connected to each other via the external pipe 10. The power source unit 200 including the pump 210 and the motor 220 is separated from the integrated hydraulic control device 100 to isolate operational noise. Also, the master cylinder 110, the reservoir 115, and the pedal simulator 180 are incorporated into the integrated hydraulic control device 100 as a single unit, and functions of an ESC and HPU are included in the integrated hydraulic control device 100, to reduce the weight of the integrated electronic hydraulic brake system and improve installation space of the integrated electronic hydraulic brake system.

Hereinafter, structures and functions of the components constituting the integrated electronic hydraulic brake system will be described in more detail. First, the master cylinder 110, which may have at least one chamber to generate hydraulic pressure, has two chambers respectively having a first piston 111 and a second piston 112 therein as shown in FIG. 2. Thereby, the master cylinder 110 generates hydraulic pressure according to pedal force of the brake pedal 30 and is connected to the two hydraulic circuits HC1 and HC2. The reservoir 115 containing oil is installed at the upper side of the master cylinder 110, and the master cylinder 110 is provided with an outlet at the lower portion thereof to allow oil discharged from the outlet to be transmitted to the wheel cylinders 20 installed at the wheels RR, RL, FR and FL.

The two chambers of the master cylinder 110 are connected to the two hydraulic circuits HC1 and HC2 to secure safety when a failure occurs.

According to the embodiment of the present invention, the electronic hydraulic brake system is installed in an X-Split vehicle. Here, X-Split vehicle refers to a vehicle in which braking is performed by controlling the two front wheels FL and FR and the two rear wheels RL and RR in a manner which pairs one of the front wheels on one side with one of the rear wheels on the other side. As shown in FIG. 2, the first hydraulic circuit HC1 is connected to the right front wheel FR and left rear wheel RL, and the second hydraulic circuit HC2 is connected to the left front wheel FL and right rear wheel RR. The two hydraulic circuits HC1 and HC2 are independently provided as above in order that braking of the vehicle is performed even if one of the circuits malfunctions. For a front wheel-driven vehicle, malfunction of the hydraulic circuit to control the front wheels results in slippage of the vehicle. A rear wheel-driven vehicle may encounter similar troubles. On the other hand, the X-Split vehicle may stably perform braking even when one of the hydraulic circuits malfunctions.

Each of the hydraulic circuits HC1 and HC2 includes a channel connected to the wheel cylinders 20, a plurality of valves 151 and 161 is installed in the channel. In FIG. 2, the valves 151 and 161 are divided into a Normally Open type (hereinafter, "NO type") solenoid valve 151 disposed upstream of the wheel cylinders 20 to control transmission of hydraulic pressure to the wheel cylinders 20, and a Normally Closed type (hereinafter, "NC type") solenoid valve 161 disposed downstream of the wheel cylinders 20 to control the hydraulic pressure leaving the wheel cylinders 20. Opening and closing the solenoid valves 151 and 161 may be controlled by an electronic control unit (not shown) that is commonly used.

Also, each of the hydraulic circuits HC1 and HC2 includes a return channel 160 to connect the NC type solenoid valve 161 with the reservoir 115. The return channel 160 allows the hydraulic pressure transmitted to the wheel cylinders 20 to be discharged and transmitted to the reservoir 115.

Meanwhile, unexplained reference numeral 31 indicates an input rod installed at the brake pedal 30 to transmit pedal force to the master cylinder 110.

At least one pump 210 is provided to pump the oil introduced from the reservoir 115 with high pressure to generate braking pressure. At one side of the pump 210 is provided the motor 220 to provide driving force to the pump 210. The motor 220 may be driven, receiving the driver's intention to brake the vehicle according to the pedal force of the brake pedal 30 from the second pressure sensor 102, which will be described later, or a pedal displacement sensor.

The accumulator 120 is provided at the outlet of the pump 210 to temporarily store high-pressure oil generated by driving the pump 210. That is, as described above, the accumulator 120 is connected to the pump 210 via the external pipe 10. In the external pipe 10 is installed a check valve 135 to prevent backward flow of the high-pressure oil stored in the accumulator 120.

At the outlet of the accumulator 120 is provided the first pressure sensor 101 to measure oil pressure of the accumulator 120. The oil pressure measured by the first pressure sensor 101 is compared with a pressure set by the electronic control unit (not shown). If the measured oil pressure is low, the pump 210 is driven to suction oil from the reservoir 115 and to supply the suctioned oil to the accumulator 120.

To supply braking oil stored in the accumulator 120 to the wheel cylinders 20 through the pump 210 and the motor 220, a connection channel 130 connected to the external pipe 10 is provided. The connection channel 130 is connected to a first inflow channel 131 connected to the first hydraulic circuit HC1 and to a second inflow channel 132 connected to the second hydraulic circuit HC2. In the first inflow channel 131 connected to the connection channel 130 are provided the first flow control valve 141 and the first pressure reducing valve 143 to control braking oil stored in the accumulator 120. In the second inflow channel 132 connected to the connection channel 130 are provided the second flow control valve 142 and the second pressure reducing valve 144 to control braking oil stored in the accumulator 120. That is, braking oil in the accumulator 120 may be supplied to the respective wheel cylinders 20 via the first inflow channel 131 and the second inflow channel 132.

The first and second flow control valves 141 and 142 and the first and second pressure reducing valves 143 and 144 are NC type solenoid valves which remain closed in normal times. Thus, when the driver applies force to the brake pedal 30, the flow control valve 141 opens and transfers the braking oil stored in the accumulator 120 to the wheel cylinders 20.

In addition, the integrated hydraulic control device 100 may further include pulsation attenuators 145 provided in the first inflow channel 131 and the second inflow channel 132 to minimize pressure pulsation. The pulsation attenuators 145 are devices that temporarily store oil to attenuate pulsation generated between the flow control valves 141 and 142 and pressure reducing valves 143 and 144 and the NO type solenoid valves 151. The pulsation attenuators 145 are well known in the art to which the present invention pertains, and therefore a detailed description thereof will be omitted.

Meanwhile, unexplained reference numeral 103 indicates pressure sensors installed in the first and second inflow channels 131 and 132 to sense pressure of braking oil supplied to the inflow channels 131 and 132. Thereby, the pulsation attenuators 145 may be controlled such that pulsation is attenuated according to the pressure of the braking oil sensed by the pressure sensors 103.

According to the embodiment of the present invention, a first backup channel 171 and a second backup channel 172 may be provided to connect the master cylinder 110 with the two hydraulic circuits HC1 and HC2 when the integrated electronic hydraulic brake system malfunctions. In the first backup channel 171 may be provided a first shut off valve 173 to open and close the first backup channel 171.

In the second backup channel 172 may be provided a second shut off valve 174 to open and close the second backup channel 172. The first backup channel 171 is connected to the first inflow channel 131 via the first shut off valve 173. The second backup channel 172 is connected to the second inflow channel 132 via the second shut off valve 174. Particularly, the second pressure sensor 102 to measure oil pressure of the master cylinder 110 may be provided between the first shut off valve 173 and the master cylinder 110. When braking is normally performed, therefore, the backup channels 171 and 172 are shut off by the first shut off valve 173 and the second shut off valve 174, and the driver's intention of braking is determined by the second pressure sensor 102. The first and second shut off valves 173 and 174 are NC type solenoid valves which remain open in normal times and is closed when braking is normally performed.

According to the embodiment of the present invention, the pedal simulator 180 to generate pedal force of the brake pedal 30 is provided between the second pressure sensor 102 and the master cylinder 110.

The pedal simulator 180 includes a simulation chamber 182 to store oil discharged from the outlet of the master cylinder 110 and a simulation valve 186 provided at the inlet of the simulation chamber 182. The simulation chamber 182, which includes a piston 183 and an elastic member 184, is adapted to have a predetermined range of displacement based on oil introduced into the simulation chamber 182. The simulation valve 186 is an NC type solenoid valve which remains closed in normal times. When the driver pushes the brake pedal 30, the simulation valve 186 is opened to supply the braking oil to the simulation chamber 182.

Also, a simulation check valve 185 is provided between the pedal simulator 180 and the master cylinder 110, i.e. between the pedal simulator 180 and the simulation valve 186. The simulation check valve 185 is connected to the master cylinder 110. The simulation check valve 185 is adapted to transmit pressure generated by pedal force of the brake pedal 30 to the pedal simulator 180 only through the simulation valve 186. The simulation check valve 185 may be a pipe check valve having no spring to return the remaining pressure of the pedal simulator 180 when the pedal force of the brake pedal 30 is released.

According to the embodiment of the present invention, the balance valve 190 connects the two hydraulic circuits HC1 and HC2 and controls pressure difference between the two hydraulic circuits HC1 and HC2. The balance valve 190 is an NC type solenoid valve which remains closed in normal times and is opened when pressure difference occurs between the two hydraulic circuits HC1 and HC2 based on pressure information. That is, as the balance valve 190 arranged between the two hydraulic circuits HC1 and HC2 is an NC type solenoid valve, the two hydraulic circuits HC1 and HC2 are independently controllable, and further braking stability may be improved as occurrence of pressure difference between the two hydraulic circuits is suppressed by opening the balance valve 190 when the pressure difference occurs.

The integrated hydraulic control device 100 is provided as a block including an electronic control unit (ECU) (not shown) electrically connected to the valves and the sensors to control the valves and the sensors, and therefore the integrated electronic hydraulic brake system is allowed to have a compact structure. That is, the integrated electronic hydraulic brake system according to the embodiment of the present invention is divided into the power source unit 200 including the motor 220 and the pump 210 and the integrated hydraulic control device 100 including the accumulator 120, the valves, the sensors and the pedal simulator 180 to generate pedal force of the brake pedal 30 configured as a single block. Consequently, installation space of the integrated electronic hydraulic brake system is easily secured, and the weight of the integrated electronic hydraulic brake system is reduced.

Hereinafter, operation of the integrated electronic hydraulic brake system according to the embodiment of the present invention will be described in detail.

Figure 3:
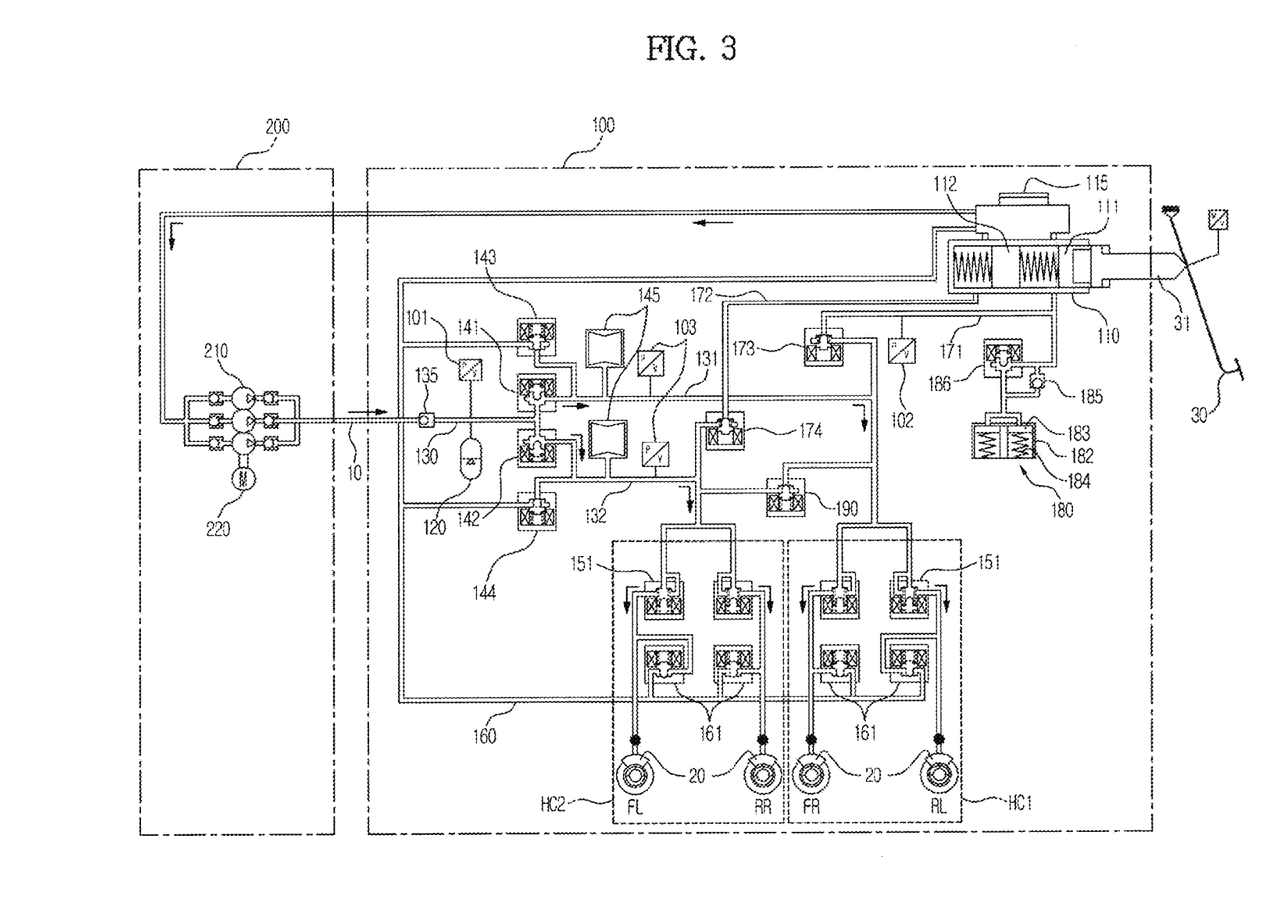
FIG. 3 is a hydraulic circuit diagram showing a state in which the integrated electronic hydraulic brake system according to the embodiment of the present invention is normally operated.

FIG. 3 is a hydraulic circuit diagram showing a state in which the integrated electronic hydraulic brake system is normally operated.

Referring to FIG. 3, when braking is commenced by a driver, the amount of braking required by the driver is sensed based on information on pressure to the brake pedal 30 pushed by the driver, measured by the second pressure sensor 102 or pedal displacement sensor. The ECU (not shown) may receive the amount of regenerative braking, calculate the amount of frictional braking based on the difference between the amount of braking required by the driver and the amount of regenerative braking, and thereby detect the magnitude of increase or decrease of pressure at the wheels.

Specifically, when the driver pushes the brake pedal 30 at the initial stage of braking, the vehicle is sufficiently braked by the regenerative braking, and therefore control may be performed not to generate the amount of frictional braking. Consequently, it may be necessary to reduce the pressure of braking oil so that hydraulic pressure applied from the brake pedal 30 to the master cylinder 10 is not transmitted to the wheel cylinders 20. At this time, the pressure reducing valves 143 and 144 are opened to discharge hydraulic pressure generated in the inflow channels 131 and 132 to the reservoir 115. As a result, no pressure is generated at the wheels RR, RL, FR, and FL, and the pressure of the brake pedal is maintained.

Thereafter, an operation of adjusting the amount of frictional braking may be performed based on change in the amount of regenerative braking. The amount of regenerative braking, which varies depending on the battery charge level or velocity of the vehicle, is drastically reduced when the velocity of the vehicle is a predetermined value or less. To control hydraulic pressure of the wheel cylinders 20 to cope with such situation, the first flow control valve 141 may control the flow rate of the braking oil supplied from the accumulator 120 to the first inflow channel 131.

In the same manner, the second flow control valve 142 may control the flow rate of the braking oil supplied from the accumulator 120 to the second inflow channel 132.

Afterward, there is no amount of regenerative braking, and thus braking may be performed according to a usual braking condition.

Meanwhile, when there is a difference between pressures transmitted to the two hydraulic circuits HC1 and HC2 in braking, the NC type balance valve 190 is opened to control the pressure difference in the two hydraulic circuits HC1 and HC2. That is, as the balance valve 190 arranged between the two hydraulic circuits HC1 and HC2 is an NC type solenoid valve, the two hydraulic circuits HC1 and HC2 are independently controllable, and further braking stability may be improved as the pressure difference in the two hydraulic circuits HC1 and HC2 is suppressed by opening the balance valve 190 when the pressure difference occurs.

Also, the pressure generated by the master cylinder 110 according to the pedal force of the brake pedal 30 is transmitted to the pedal simulator 180 connected to the master cylinder 110. At this time, the simulation valve 186 disposed between the master cylinder 110 and the simulation chamber 182 is opened to supply hydraulic pressure to the simulation chamber 182, and thereby the piston 183 moves and pressure corresponding to the weight of the spring 184 supporting the piston 183 is generated in the simulation chamber 182, providing proper pedal feel to the driver.

Figure 4:
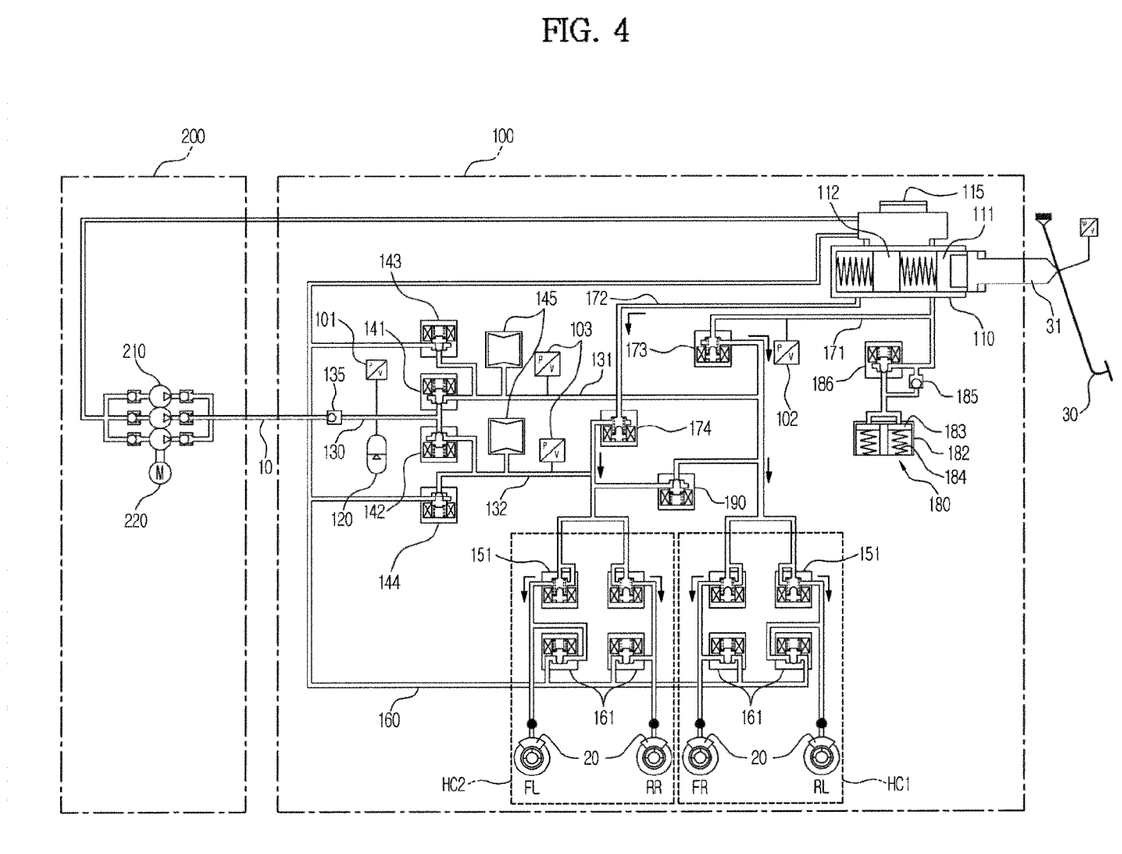
FIG. 4 is a hydraulic circuit diagram showing a state in which the integrated electronic hydraulic brake system according to the embodiment of the present invention is abnormally operated.

FIG. 4 is a hydraulic circuit diagram showing a state in which the integrated electronic hydraulic brake system is abnormally operated.

Referring to FIG. 4, for backup braking in a case in which the integrated electronic hydraulic brake system is not normally operated, braking oil is supplied to the wheel cylinders 20 via the first and second backup channels 171 and 172 to perform backup braking. Here, since the first and second shut off valves 173 and 174 installed in the first and second backup channels 171 and 172 and the solenoid valves 151 of the two hydraulic circuits HC1 and HC2 are NO type solenoid valves in open state, and the first and second flow control valves 141 and 142, and the first and second pressure reducing valves 143 and 144 are NC type solenoid valves in closed state, hydraulic pressure is directly transmitted to the wheel cylinders 20. Thereby, stable braking may be performed and braking stability may be enhanced.

The master cylinder 110 may have a smaller inner diameter than a conventional master cylinder to maximize the performance of mechanical braking based on pedal force of the brake pedal 30. That is, the master cylinder may provide sufficient braking force through braking oil stored in the master cylinder although the master cylinder 110 has a smaller inner diameter than the conventional master cylinder.

As is apparent from the above description, the integrated electronic hydraulic brake system according to the embodiment of the present invention has effects as follows.

First, the integrated electronic hydraulic brake system is divided into the power source unit including the pump and the motor and the integrated hydraulic control device including the accumulator, the valves, the sensors and the pedal simulator to generate pedal force of the brake pedal configured as a single block. Consequently, installation space of the integrated electronic hydraulic brake system may be easily secured, and the weight of the integrated electronic hydraulic brake system may be reduced. Also, the integrated electronic hydraulic brake system may be easily assembled.

Second, since the balance valve arranged between the two hydraulic circuits is a Normally Closed type solenoid valve, the two hydraulic circuits are independently controllable, and further braking stability may be improved as occurrence of pressure difference in the two hydraulic circuits is suppressed by opening the balance valve when the pressure difference occurs.

Third, braking of a vehicle is allowed when the brake system malfunctions, and therefore the integrated electronic hydraulic brake system is easily applied to electric vehicles, fuel cell vehicles and hybrid vehicles.

Fourth, the remaining pressure is minimized by the simulation check valve having no spring, and pedal feel delivered to a driver may be stably maintained even when pressure is arbitrarily adjusted during braking.

Fifth, the integrated electronic hydraulic brake system generates braking force required by a user regardless of whether an engine is present and whether the engine is operated, thereby contributing to improvement of fuel efficiency.

Sixth, the integrated electronic hydraulic brake system has a simpler configuration than a conventional negative pressure type booster, and does not use suction pressure of an engine unlike a vacuum brake, thereby improving fuel efficiency of a vehicle. Furthermore, due to its simple configuration, the integrated electronic hydraulic brake system may be easily applied to a small vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An integrated electronic hydraulic brake system for a vehicle comprising:
    an integrated hydraulic control device comprising a master cylinder to generate hydraulic pressure based on pedal force of a brake pedal, a reservoir coupled to an upper portion of the master cylinder to store oil, two hydraulic circuits, each of the hydraulic circuits being connected to two different pairs of wheels of the vehicle, an accumulator to store a predetermined level of pressure, flow control valves and pressure reducing valves connected to the two hydraulic circuits to control pressure transmitted from the accumulator to wheel cylinders installed at the wheels, a balance valve to connect the two hydraulic circuits and control pressure difference between the two hydraulic circuits, a pedal simulator connected to the master cylinder to provide reaction force of the brake pedal, and a simulation valve to control connection between the master cylinder and the pedal simulator; and
    a power source unit comprising a pump to suction oil from the reservoir and discharge the suctioned oil to the accumulator to generate pressure in the accumulator and a motor to drive the pump, wherein
    the power source unit is configured as a separate unit to isolate noise generated from the power source unit, and the integrated hydraulic control device and the power source unit are connected to each other via an external pipe,
    wherein the balance valve is provided on a path connecting a first inlet path provided between one of the hydraulic circuits and one of the flow control valves to a second inlet path provided between the remaining hydraulic circuit and the remaining flow control valve,
    wherein the flow control valves are connected in parallel to the accumulator.

2. The integrated electronic hydraulic brake system according to claim 1, wherein the two hydraulic circuits include a first hydraulic circuit connected to a right front wheel and a left rear wheel, and a second hydraulic circuit connected to a left front wheel and a right rear wheel.

3. The integrated electronic hydraulic brake system according to claim 1, wherein the balance valve is a Normally Closed solenoid valve, the balance valve being closed in normal times and opened based on pressure information when the pressure difference occurs between the two hydraulic circuits.

4. The integrated electronic hydraulic brake system according to claim 1, wherein the accumulator and the pump are connected to each other via the external pipe, and the external pipe has a check valve installed therein to prevent backward flow of pressure of the accumulator.

5. The integrated electronic hydraulic brake system according to claim 1, further comprising a return channel, and wherein each of the hydraulic circuits comprises:
    a Normally Open solenoid valve disposed upstream of the wheel cylinders to control transmission of the hydraulic pressure to the wheel cylinders;
    a Normally Closed solenoid valve disposed downstream of the wheel cylinders to control discharge of the hydraulic pressure from the wheel cylinders; and
    the return channel connects each of the Normally Closed solenoid valves to the reservoir.

6. The integrated electronic hydraulic brake system according to claim 1, wherein the integrated hydraulic control device further comprises first and second backup channels to connect the master cylinder to the two hydraulic circuits to control braking oil when the integrated electronic hydraulic brake system is abnormally operated, a first shut off valve to control connection between the first backup channel and the master cylinder, and a second shut off valve to control connection between the second backup channel and the master cylinder.

7. The integrated electronic hydraulic brake system according to claim 6, wherein the first and second shut off valves are Normally Open valves adapted to remain open in normal times and be closed during normal operation of braking.

8. The integrated electronic hydraulic brake system according to claim 1, wherein a simulation check valve is further provided in a channel connecting the master cylinder to the pedal simulator such that the pressure according to the pedal force of the brake pedal is transmitted to the pedal simulator only through the simulation valve.

9. The integrated electronic hydraulic brake system according to claim 8, wherein the simulation check valve is a pipe check valve having no spring to return the remaining pressure of the pedal simulator when the pedal force of the brake pedal is released.

10. The integrated electronic hydraulic brake system according to claim 1, wherein a plurality of pulsation attenuators are provided in channels connecting the flow control valves and pressure reducing valves with the two hydraulic circuits to minimize pressure pulsation.

11. The integrated electronic hydraulic brake system according to claim 10, wherein the flow control valves and the pressure reducing valves are Normally Closed valves adapted to remain closed in normal times.

* * * * *